United States Patent

Parker et al.

(10) Patent No.: US 7,896,302 B2
(45) Date of Patent: Mar. 1, 2011

(54) JET PUMP SENSING LINE T-BOLT CLAMP ASSEMBLY

(75) Inventors: Stephen Kent Parker, Fremont, CA (US); John Geddes Erbes, Mountain View, CA (US)

(73) Assignee: Ge-Hitachi Nuclear Energy Americas LLC, Wilmington, NC (US)

( * ) Notice: Subject to any disclaimer, the term of this patent is extended or adjusted under 35 U.S.C. 154(b) by 360 days.

(21) Appl. No.: 11/907,335

(22) Filed: Oct. 11, 2007

(65) Prior Publication Data

US 2009/0095849 A1    Apr. 16, 2009

(51) Int. Cl.
| | |
|---|---|
| A47B 96/06 | (2006.01) |
| E04G 3/00 | (2006.01) |
| E04G 5/06 | (2006.01) |
| F16B 1/00 | (2006.01) |
| G09F 7/18 | (2006.01) |
| F16L 3/08 | (2006.01) |
| F16L 3/00 | (2006.01) |
| E21F 17/02 | (2006.01) |

(52) U.S. Cl. .................. 248/229.1; 248/74.4; 248/228.6; 248/230.6; 248/231.61; 248/231.71; 248/62; 248/226.11; 248/229.2; 248/229.24; 248/229.26; 248/229.14; 248/229.15

(58) Field of Classification Search .............. 248/229.1, 248/74.4, 228.6, 230.1, 230.6, 231.61, 231.71, 248/62, 67.5, 73, 226.11, 229.2, 229.24, 248/229.25, 229.26, 229.14, 229.15; 411/84–85
See application file for complete search history.

(56) References Cited

U.S. PATENT DOCUMENTS

| | | | | |
|---|---|---|---|---|
| 3,019,954 | A | * | 2/1962 | Faltin ............................ 224/483 |
| 3,286,762 | A | * | 11/1966 | McIntosh et al. ............... 431/80 |
| 4,675,149 | A | | 6/1987 | Perry et al. |
| 5,752,807 | A | * | 5/1998 | Erbes ............................ 417/63 |
| 6,390,506 | B1 | * | 5/2002 | Michalski et al. ............ 280/779 |
| 6,434,208 | B1 | * | 8/2002 | Erbes et al. ................... 376/260 |
| 6,435,839 | B1 | | 8/2002 | Erbes |
| 7,207,530 | B2 | * | 4/2007 | Ismert et al. ................. 248/74.4 |

OTHER PUBLICATIONS

Extended European Search Report dated Sep. 29, 2009, issued in corresponding European Application No. 08166213.2-2424.

* cited by examiner

*Primary Examiner* — Terrell Mckinnon
*Assistant Examiner* — Christopher Garft
(74) *Attorney, Agent, or Firm* — Nixon & Vanderhye PC

(57) ABSTRACT

A remotely installable piping support attachment assembly employs a T-bolt type fastener for clamping a relatively smaller instrumentation pipe, e.g., the jet pump sensing line, to the wall of an adjacent structure. The attachment assembly includes a T-bolt, a split pipe clamp support, a ratchet nut with peripheral ratchet teeth, and a ratchet lock washer. When the nut is tightened on the threaded shank of the T-bolt, a top plate and an anchor of the split pipe clamp support are pressed together to clamp the jet pump sensing line therebetween. The top plate is defined by an L-beam folded spring plate comprised of first and second plate parts disposed generally in parallel and joined at a living hinge flex joint so that said plate parts each have a free end edge remote from said flex joint, the free end edges being spaced apart to define a gap therebetween without preload.

20 Claims, 5 Drawing Sheets

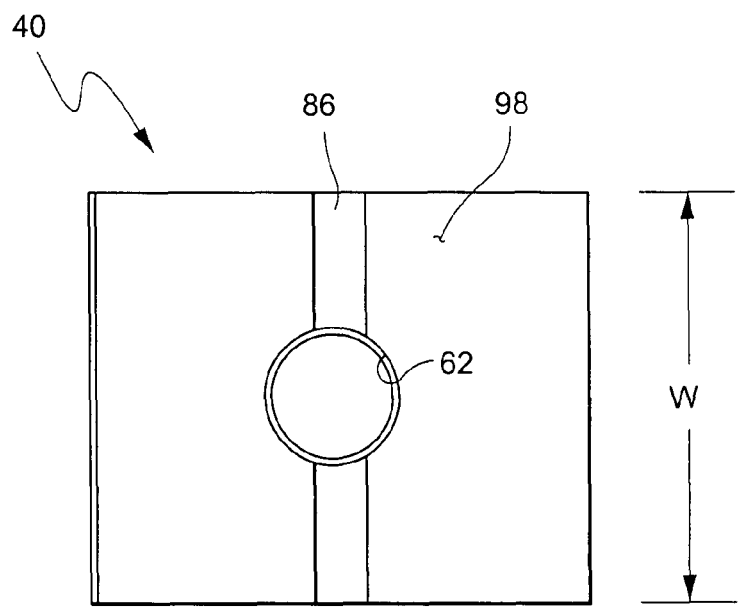
Fig. 5
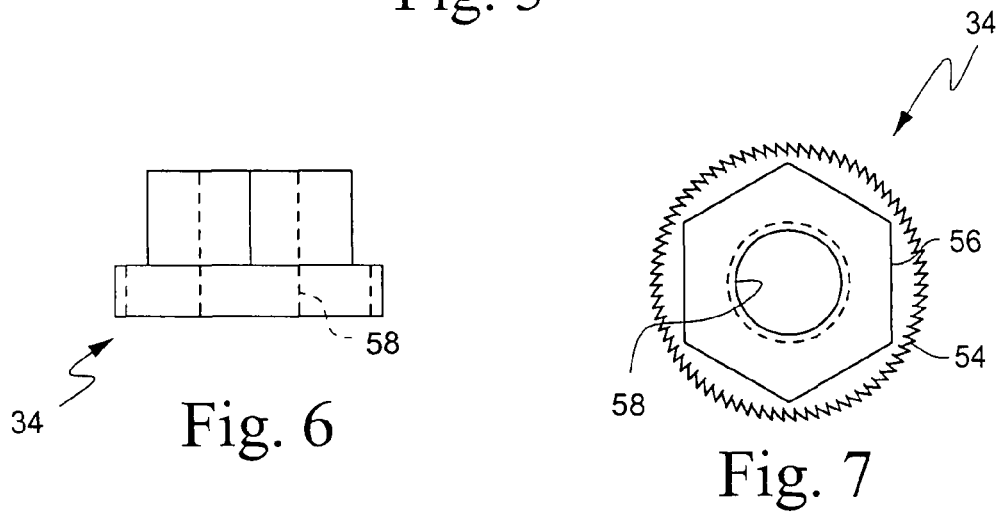
Fig. 6
Fig. 7
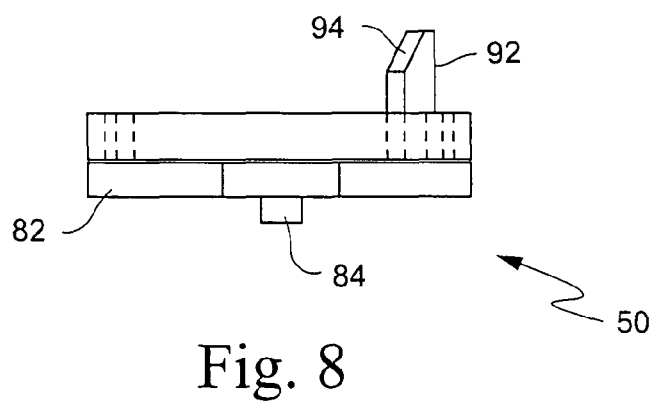
Fig. 8 ns, and a first hole penetrated by said shank,
JET PUMP SENSING LINE T-BOLT CLAMP ASSEMBLY

BACKGROUND OF THE INVENTION

This invention relates to maintenance and repair of nuclear reactors. In particular, the invention relates to the repair of the pressure sensing lines mounted on the jet pump assemblies in a boiling water reactor.

In a boiling water reactor (BWR), hollow tubular jet pumps positioned within the shroud annulus provide the required reactor core flow. They are fitted with pressure taps connected by 0.54" O.D. sensing line piping to outside instrumentation, allowing necessary measurement and monitoring of the core flow. The flow through and outside the jet pumps contains pressure fluctuations from various sources in the reactor system. The pressure fluctuations can have frequencies close to one or more natural vibration modes of the sensing line piping, which depend on the spacing and stiffness of existing welded supports which attach the piping to the jet pump. When an excitation frequency happens to be too close to matching the piping natural frequency at some particular location, vibration of the piping exerts loads on its support attachments which have caused cyclic fatigue cracking and failure of both the piping and its welded attachments to the supports. This can result in loss of the indication of core flow, which if it occurs at enough locations, may require plant shutdown.

U.S. Pat. No. 5,752,807 describes rigid clamp supports for selected locations along the jet pump sensing line (JPSL) to prevent resonant vibration of the pipe. It is necessary that the T-bolt support attachments remain tightly preloaded during operation to prevent loss of the support function from vibration induced wear and fatigue. A threaded nut is tightened by torqueing to the T-bolt to apply preload at installation. A spring ratchet locking device is used to keep the nut from loosening. However, the resultant elongation of the relatively stiff T-bolt attachment is small, such that subsequent wear, corrosion, locking device clearances, and relaxation could diminish the required preload.

Modifications were implemented subsequent to the development of the '807 design, including the addition of two Belleville washers to add flexibility and elastic strain to the otherwise stiff connection, and the use of crimping collar locking device instead of the ratchet locking device of the '807 clamp. A cam slot was also added in the T-bolt shank to effect the required rotation of the T-bolt at installation and replace the square neck fitup used to lock subsequent rotation of the T-bolt.

More specifically, a number of JPSL T-bolt clamp assemblies 10 were installed at the WNP2 Nuclear Power Station in 1996. This design, schematically illustrated in FIG. 1, used two Belleville washer springs (cupped spring washers) 12 to add flexibility and elastic strain to the otherwise stiff bolted connection comprised of the clamp base 14, top plate 16, threaded nut 18, crimping collar 20 and T-bolt 22. The added elongation assures there is margin to keep the assembly tightly preloaded to assure its vibration support function.

The FIG. 1 design was recently reviewed for application in a plant in Japan, specifically to assure it can meet their more restrictive stress corrosion limit for the Ni—Cr—Fe alloy X-750 material of its construction. It was found the stresses in the Belleville washers 12 exceeded the Japan allowable limit and the current U.S. limit.

BRIEF DESCRIPTION OF THE INVENTION

An embodiment of this invention assures that preload is maintained by providing additional flexibility and elastic strain in the otherwise stiff bolted connection.

The invention may be embodied in an assembly comprising: a first fastening element comprising a shank having an axis and a head, said shank comprising a threaded portion; a second fastening element comprising a threaded hole, said threaded portion of said shank of said first fastening element being threadably engaged with said threaded hole of said second fastening element; first and second clamping components disposed axially between and clamped together by said first and second fastening elements; said first clamping component having a first recess, a projection with first and second contact surfaces, and a first hole penetrated by said shank, said first clamping component being defined by an L-beam folded spring plate comprised of first and second plate parts disposed generally in parallel and joined at a living hinge flex joint so that said plate parts each have a free end edge remote from said flex joint, said free end edges being spaced apart to define a gap therebetween without preload, said plate parts each including a first portion that together define said projection with said first and second contact surfaces and are joined at said living hinge, and said plate parts each including a second portion disposed at an angle with respect to said first portion, said second portions together defining said first hole penetrated by said shank and terminating in said free end edges.

The invention may also be embodied in a clamp assembly comprising: a T-bolt comprising a shank having an axis and a head extending generally perpendicular to said shank axis, said shank comprising a threaded portion and said head having a length greater than a diameter of said shank; a first clamping element having a first recess, a projection with first and second contact surfaces, and a first hole penetrated by a first portion of said shank, said first recess being a cylindrical section having an axis, said first clamping element being defined by an L-beam folded spring plate comprised of first and second plate parts disposed generally in parallel and joined at a living hinge flex joint so that said plate parts each have a free end edge remote from said flex joint, said free end edges being spaced apart to define a gap without preload, said plate parts each including a first portion that together define said projection with said first and second contact surfaces, and said plate parts each including a second portion disposed at an angle with respect to said first portion, said second portions together defining said first hole penetrated by said shank and terminating in said free end edges; a second clamping element having a second recess, a land, a shoulder, and a second hole penetrated by a second portion of said shank, said second recess being a cylindrical section having an axis generally parallel to said axis of said first recess, said first contact surface of said projection of said first clamping element abutting said land, and said second contact surface of said projection of said first clamping element abutting said shoulder, and said first recess opposing said second recess such that a pipe of predetermined diameter arranged therebetween is thereby clamped; and a threaded nut threadably coupled to said threaded portion of said shank, said first and second clamping elements being pressed together by a compressive load applied by said nut when tightened on said T-bolt.

The invention may further be embodied in an apparatus comprising: a jet pump having an elongated hole having a width and a length formed in a wall thereof; a jet pump sensing line; and a clamping assembly attached to said jet pump and clamping said jet pump sensing line, wherein said clamping assembly comprises: a T-bolt comprising a shank having an axis and an elongated head extending generally perpendicular to said shank axis, said shank comprising a threaded portion and said head having a length greater than a diameter of said shank, greater than said width of said elongated hole and less than said length of said elongated hole; a first clamping element having a first recess, a projection with first and second contact surfaces, and a first hole penetrated by a first portion of said shank, said first recess being in contact with said jet pump sensing line, said first clamping element being defined by an L-beam folded spring plate comprised of first and second plate parts disposed generally in parallel and joined at a living hinge flex joint so that said plate parts each have a free end edge remote from said flex joint, said free end edges being spaced apart to define a gap without preload, said plate parts each including a first portion that together define said projection with said first and second contact surfaces, and said plate parts each including a second portion disposed at an angle with respect to said first portion, said second portions together defining said first hole penetrated by said shank and terminating in said free end edges; a second clamping element having a second recess and a second hole penetrated by a second portion of said shank, said second recess being in contact with said jet pump sensing line and opposing said first recess; and a threaded nut threadably coupled to said threaded portion of said shank, said first and second clamping elements being pressed together by a compressive load produced when said nut is tightened on said T-bolt, whereby said jet pump sensing line is clamped.

BRIEF DESCRIPTION OF THE DRAWINGS

FIG. 5 is a top plan view of the top plate of FIG. 3;

FIG. 6 is an elevational view of a nut for the fastener of FIG. 2;

FIG. 7 is a top plan view of the nut of FIG. 6;

FIG. 8 is an elevational view of a ratchet lock for the T-bolt fastener illustrated in FIG. 2.

DETAILED DESCRIPTION OF THE INVENTION

The invention is embodied in an improvement to the compact, remotely installable pipe support attachment, utilizing a T-bolt type of blind fastener to clamp a relatively smaller instrumentation pipe to the wall of an adjacent jet pump structure, as disclosed and illustrated in U.S. Pat. No. 5,752,807, the disclosure of which is incorporated herein by this reference. The purpose of the '807 piping support attachment was to add a rigid clamp support for selected locations along the JPSL to prevent vibration of the pipe. As noted above, it is necessary that the T-bolt support attachments remain tightly preloaded during operation to prevent loss of the support function from vibration induced wear and fatigue.

The present invention is embodied in an improvement to the '807 patent structure that assures preload is maintained by providing additional flexibility and elastic strain in the otherwise stiff bolted connection. More specifically, the invention is embodied in an L-shaped beam that replaces the top plate of the '807 piping support attachment.

Because the invention is embodied in an improvement to the clamp disclosed in the '807 patent, reference is made to that patent disclosure for background information concerning particulars of the conventional boiling water reactor, the jet pump assembly, and the sensing line piping which the T-bolt clamp assemblies of the invention are adapted to secure.

Figure 2:
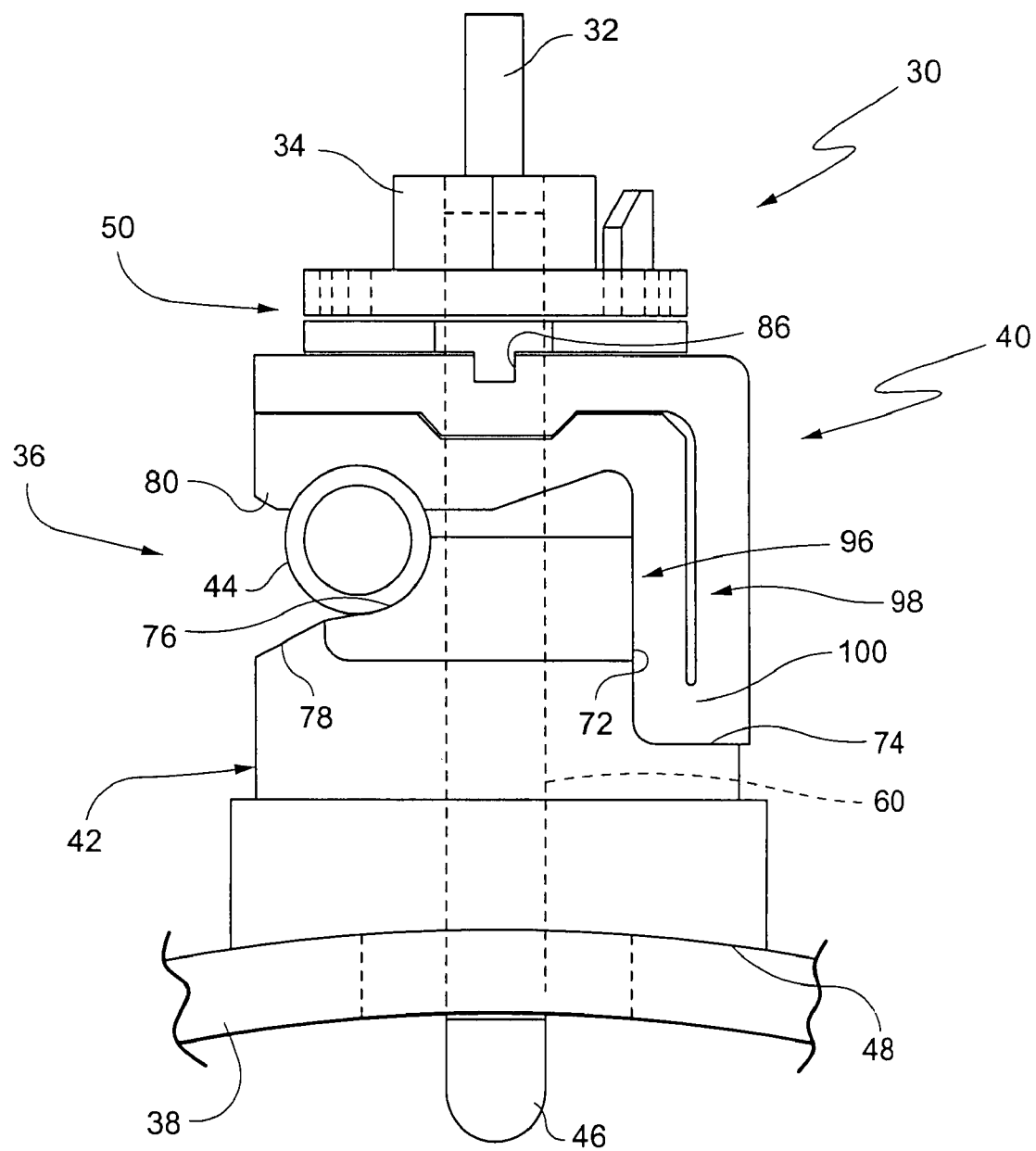
FIG. 2 is a schematic elevational view of a T-bolt type fastener embodying the invention.

A T-bolt clamp assembly 30 embodying the invention is illustrated in FIG. 2. Each T-bolt clamp assembly 30 comprises a T-bolt 32, illustrated in greater detail in the '807 patent. The T-bolt 32 and a ratchet nut 34 are threadably engaged to attach a split pipe clamp support 36 to a jet pump diffuser 38. The split pipe clamp support 36 comprises an upper clamp part, or top plate 40, and a clamp base or anchor 42, which clamp the sensing line piping 44 when the ratchet nut 34 is tightened on the T-bolt 32. The diffuser wall 38 is sandwiched tightly between a head 46 of the T-bolt 32 and a contact surface 48 of the clamp base 42. The contact surface 48 of the clamp base 42 is machined to have a curvature which matches the external curvature of the abutting portion of the diffuser 38, providing intimate contact to minimize leakage and maximize support rigidity.

In accordance with a further feature of the illustrated structure, a ratchet lock washer 50 is installed between the clamp top plate 40 and the ratchet nut 34. The ratchet lock washer has a series of ratchet teeth 52 which engage opposing ratchet teeth 54 on the periphery of nut 34, thereby locking the nut against rotation in the direction of loosening.

The manner in which the T-bolt clamp assembly 50 is installed on the diffuser generally corresponds to the manner of installation of the T-bolt clamp assembly of the '807 patent.

As seen in FIGS. 6-7, the ratchet nut 34 has a hex socket drive 56 and ratchet tooth contour 54, mentioned above, around its periphery. A threaded hole 58 is coupled to the threaded portion 60 of the T-bolt shank. As the ratchet nut 34 is rotated in the direction of tightening, the nut transfers a clamping load to the top plate 40, which in turn clamps the sensing line pipe 44 against the clamp base 42, as seen in FIG. 2.

Figure 3:
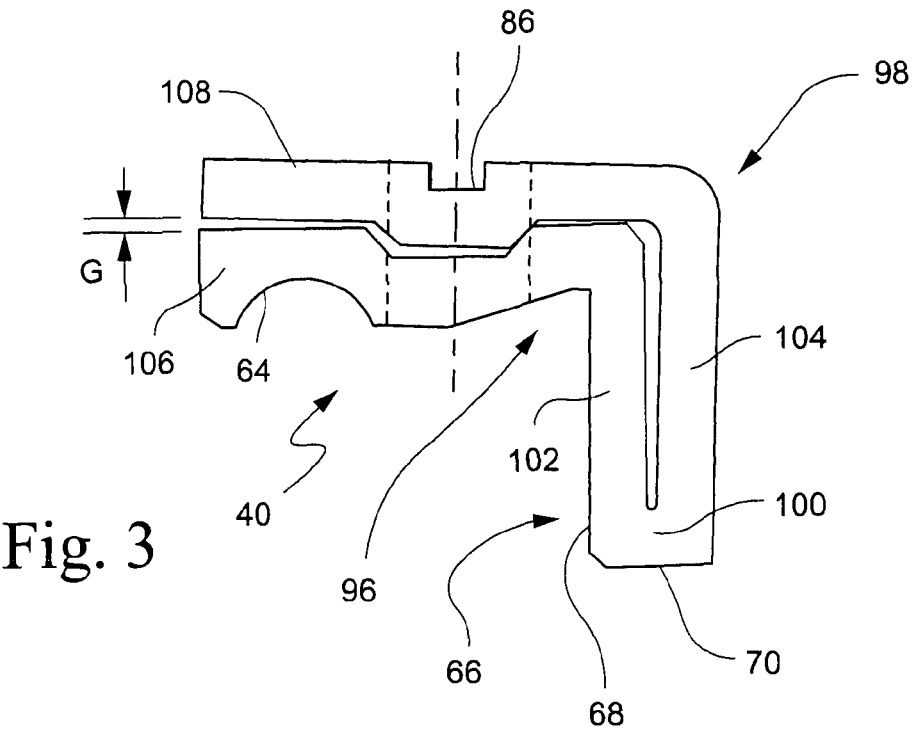
FIG. 3 is an elevational view of a top plate embodying the invention as fabricated.
Figure 4:
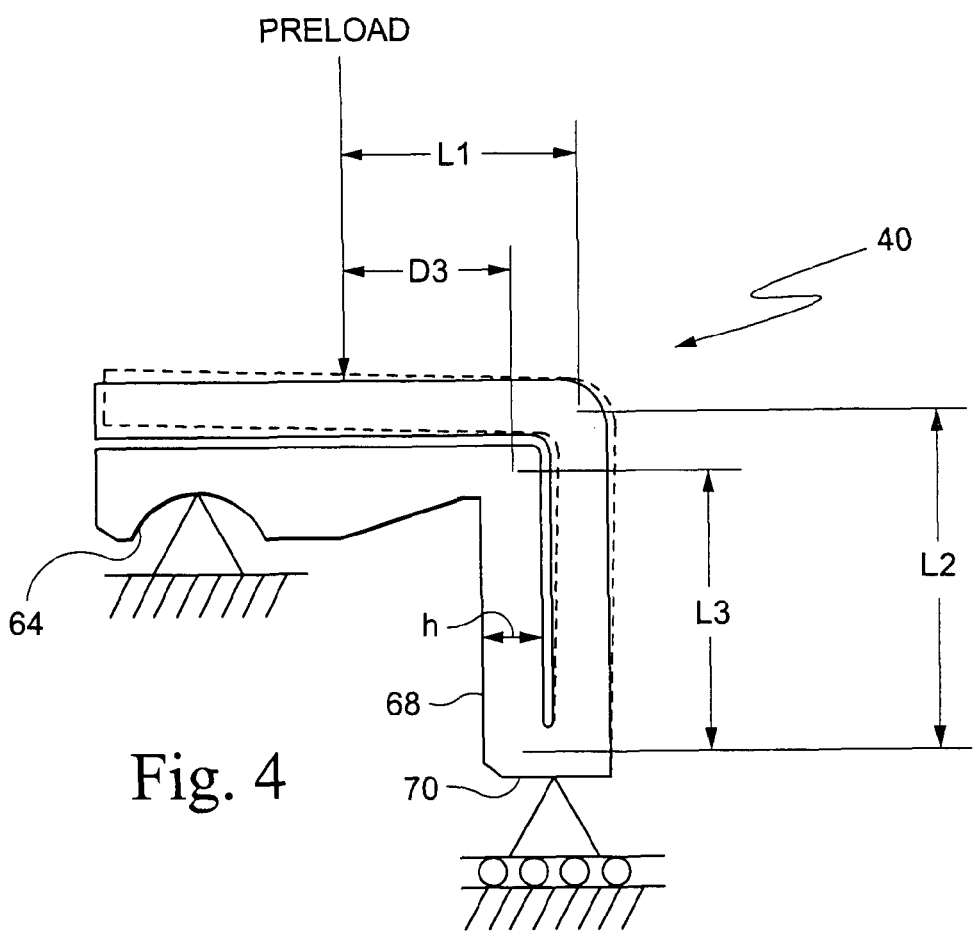
FIG. 4 is a schematic elevational view of the top plate of FIG. 3, illustrating dimensions and loading thereof.

As best seen in FIGS. 3-5, the top plate 40 has a circular unthreaded hole 62 which receives the T-bolt shank. The bottom of the top plate 40 has a radius groove 64 on one side to fit the sensing line pipe 44, and a downward projecting lip 66 on the opposing side. Width W (shown in FIG. 5) was selected at about 1.5 inches, and may be varied to adjust the desired T-bolt preload. The lip has a pair of contact surfaces 68,70 which are generally mutually perpendicular and contact opposing shoulder 72 and land 74 surfaces, respectively, of the clamp base 42. These abutting surfaces, on the side of the clamping base opposite to the jet pump sensing line lock rotation of the clamp base around the jet pump sensing line 44 during nut tightening. Also, seating of lip 66 on ledge 74 provides a fulcrum (FIG. 4) for transfer of clamp preload to the jet pump sensing line.

The clamping base 42 has a radiused groove 76 on one side to fit the sensing line 44, with an extending tapered projection 78 to facilitate its sliding into engagement with the sensing line during remote assembly. When the nut 34 is fully tightened, as shown in FIG. 2, the minimum distance between tapered projection 78 of clamp base 42 and lip 80 of top plate 40 is less than the outer diameter of the sensing line 44, so that the sensing line is clamped securely and cannot disengage.

Figure 9:
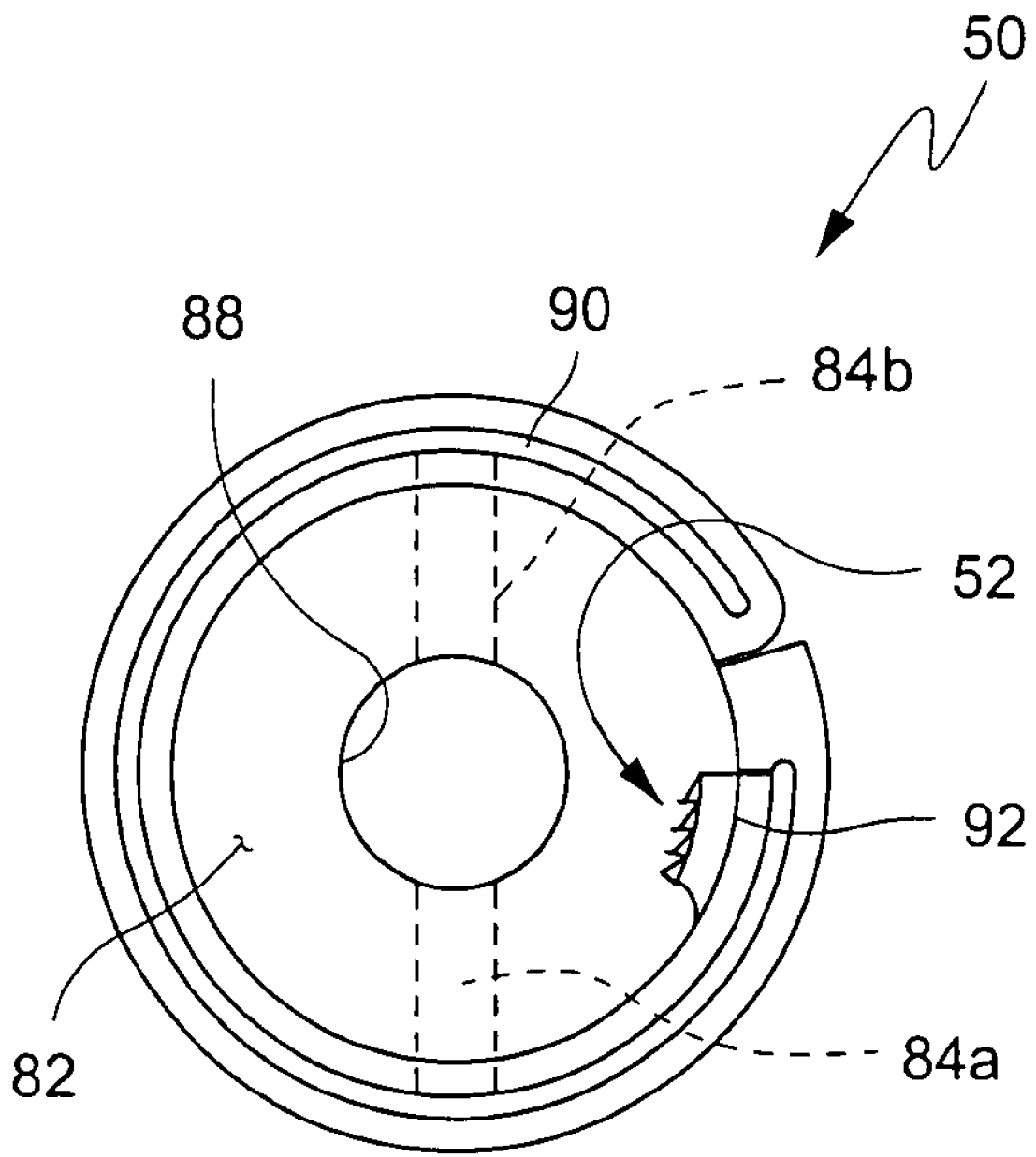
FIG. 9 is a top plan view of the ratchet lock of FIG. 8.

The ratchet nut 34 must be locked to prevent rotation in the direction of loosening. This can be accomplished by any conventional means, e.g., by tack welding the nut to the top plate. However, in accordance with one example embodiment of the invention, a ratchet lock washer 50 is installed between the nut 34 and the top plate 40. As seen in FIGS. 8-9, the lock washer 50 comprises a washer 82 having a key 84 projecting from the bottom of the washer for locking in a groove 86 formed in top plate 40. The interlocking engagement of the key 84 and groove 86 prevents rotation of lock washer 50 relative to the top plate 40. As best seen in FIG. 9, the key consists of two segments 84a,84b which lie along a diameter of the lock washer and are separated by a gap which is an extension of a circular unthreaded hole 88 in the washer 82, through which the bolt shank passes.

As shown in detail in FIG. 9, the ratchet lock washer 50 further comprises an integral spring arm 90 which encircles the ratchet teeth contour 54. The spring arm is supported at one end by a ligament (not shown in detail) which is integrally connected to both the spring arm 90 and the washer 82. The spring arm is in the shape of a circular arc. The distal end of the spring arm has an upward projection 92. The upward projection 92 has a ramped surface 94, which is impacted by the nut torquing socket (not shown) which engages the ratchet nut 34. The close circumferential clearance between the spring distal end and the adjacent fixed surface of the washer 90 prevents circumferential CCW deflection of the spring arm 90 after tightening of the nut 34 that could diminish its anti-rotation performance.

The distal end of the spring arm is further provided with a plurality (e.g., three) of ratchet teeth 52, shown in FIG. 9. The ratchet teeth project radially inward and are arranged in sequence along a circumferential line. As seen in FIG. 2, the spring arm 90 surrounds the ratchet tooth contour 54 of the nut 34. When the ratchet teeth 52 of the spring arm 90 are meshed with the ratchet teeth 54 on the nut 34, the nut cannot rotate in the direction of loosening.

The ramping surface 94 is oriented and positioned so that engagement of the torquing tool's nut drive socket deflects the distal end of the spring arm 90 radially outward (not shown). This disengages the spring arm ratchet teeth 52 from the nut ratchet teeth 54, facilitating either tightening or loosening of the nut 34.

In an embodiment of the invention, rather than providing a fixed form top plate as in the '807 patent, an L-shaped flex beam is provided to comprise the top plate. More specifically, as illustrated in FIGS. 2-4, the top plate is defined as an L-beam folded spring plate comprised of first and second plate parts that define spring legs 96,98 in elevation, integrally joined at living hinge flex joint 100. Each of the plate parts includes a first, upwardly extending or vertical, portion 102, 104 and a second, horizontally disposed, portion 106,108. As fabricated, a gap G of about 0.05 inches, more specifically, about 0.045 inches is defined at the accessible left edge without preload. Thus, the L-beam is sized and configured such that the application of the required preload closes the vertical gap G above the JPSL. It thereby acts as a non-linear spring and high bolt preload will not significantly increase the L-beam stress or deflection. This is useful to accommodate the possible variability in bolt preload due to torqueing by specifying the torque range so that the minimum preload is assured while excess preload does not over stress the L-beam. The gap at the accessible left edge also provides an in-service inspection advantage with L-beam design. More specifically, as noted, the bolt preload closes the vertical gap G above the JPSL. Thus, inspection can be performed to verify the assembly is preloaded fully (no gap), or to determine what preload remains if a gap is observed. In this manner the L-beam functions as an optical load transducer.

Figure 1:
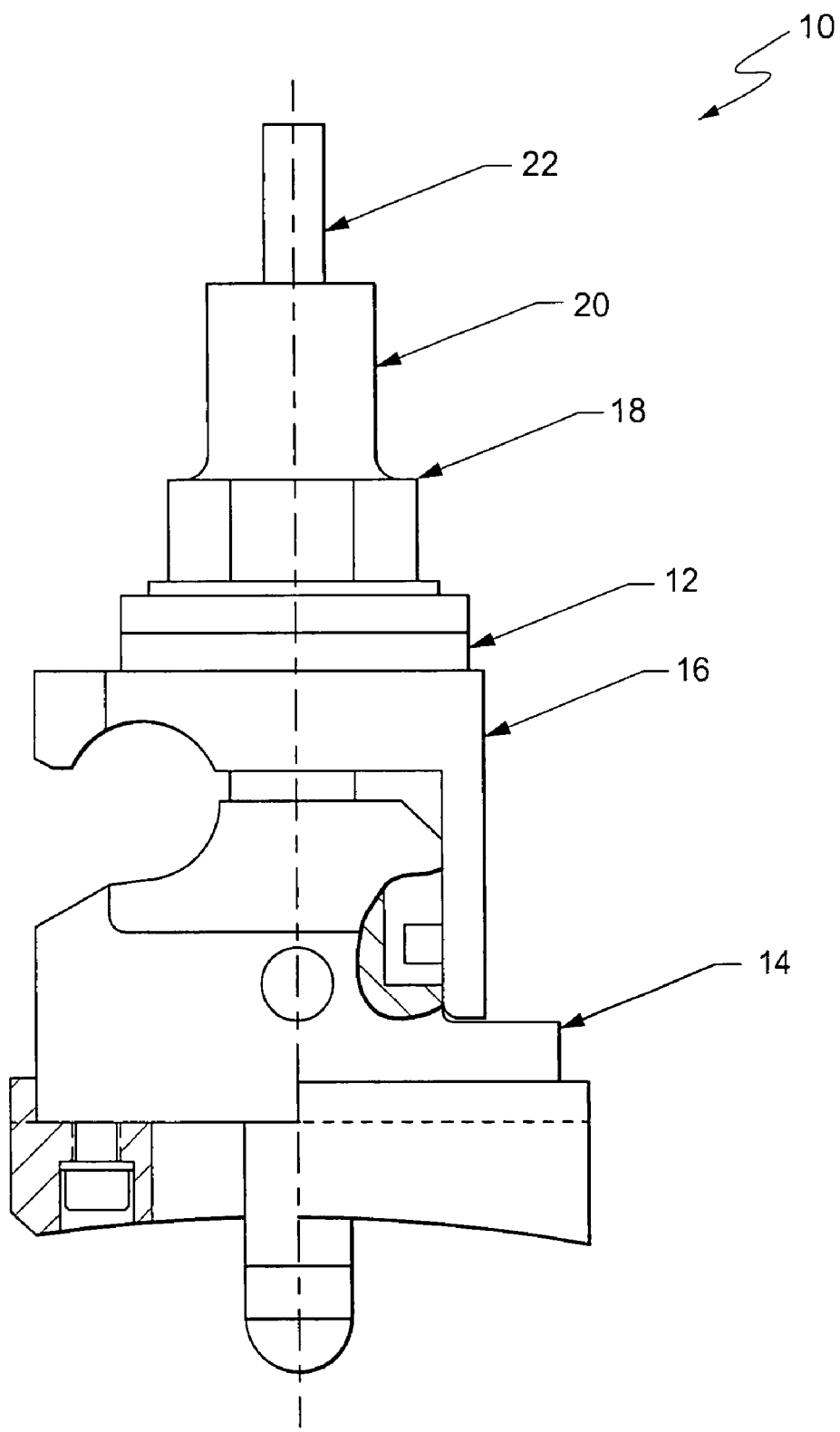
FIG. 1 is a schematic elevational view, partly broken away and partly in cross-section illustrating a prior art T-bolt clamp assembly.

The L-beam design offers several improvements in addition to eliminating the Belleville washers 12 of the FIG. 1 design. The L-beam allows distribution of the needed elastic strain over a longer load path by virtue of the folded beam configuration of the top plate and larger volume of material than the Belleville washers, resulting in lower maximum stress.

Referring to FIG. 4, example dimensions L2 and L3 of the respective vertical legs 104,102 are about 1.20 inches and 0.90 inches, respectively. Dimension L1 in an example embodiment is about 0.83 inches and dimension D3 is about 0.60 inches in an example embodiment. Finally, the thickness h of the vertical legs 102,104 is about 0.20 inches. The preferred material in this application is Ni—Cr—Fe alloy X-750, giving high strength to allow minimum size, resistance to thread galling and good corrosion resistance in the BWR environment.

With the dimensions described above, the L-beam design provides about twice the bolted joint elongation and one quarter of the stress, as compared to the Belleville washers 12.

As detailed above, according to an aspect of the invention, an L-beam design 40 was conceived to replace the two Belleville washer springs 12, to add flexibility and elastic strain to the otherwise stiff bolted connection. The L-beam design integrates an L-shaped beam into the top plate. The L-beam allows distribution of the needed elastic strain over a longer load path and larger volume of material then the Belleville washers, resulting in lower maximum stress. Most of the resultant flexibility and deflection is due to bending strain in the three elements indicated by lengths L1, L2, and L3 in FIG. 4.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly comprising:
    a first fastening element comprising a shank having an axis and a head, said shank comprising a threaded portion;
    a second fastening element comprising a threaded hole, said threaded portion of said shank of said first fastening element being threadably engaged with said threaded hole of said second fastening element;
    first and second clamping components disposed axially between and clamped together by said first and second fastening elements;
    said first clamping component having a first recess, a projection with first and second contact surfaces, and a first hole penetrated by said shank, said first clamping component being defined by an L-beam folded spring plate comprised of first and second plate parts disposed generally in parallel and joined at a living hinge flex joint so that said plate parts each have a free end edge remote from said flex joint, said free end edges being spaced apart to define a gap therebetween without preload, said plate parts each including a first portion that together define said projection with said first and second contact surfaces and are joined at said living hinge, and said plate parts each including a second portion disposed at an angle with respect to said first portion, said second portions together defining said first hole penetrated by said shank and terminating in said free end edges.

2. An assembly as in claim 1, wherein said second clamping component has a second recess, a land, a shoulder, and a second hole penetrated by said shank, said first contact surface of said projection of said first clamping component abutting said land, and said second contact surface of said projection of said first clamping component abutting said shoulder, and said first recess opposing said second recess such that a pipe of predetermined diameter arranged therebetween is thereby clamped.

3. An assembly as in claim 1, wherein second fastening element is locked so as to prevent rotation thereof in a direction of loosening with respect to said first fastening element.

4. An assembly as in claim 3, further comprising a locking element selectively engaged with said second fastening element to prevent rotation of said second fastening element in a direction of loosening.

5. The assembly as in claim 4, wherein said first clamping component includes a groove and said locking element includes a key projection engaged with said groove.

6. The assembly as defined in claim 1, wherein said first fastening element comprises a bolt and said second fastening element comprises a nut.

7. An assembly as in claim 1, wherein said first fastening element comprises a T-bolt, said head extending generally perpendicular to an axis of said shank, said head having a length greater than a diameter of said shank.

8. An assembly as in claim 1, wherein said second fastening element comprises a nut having a peripheral contour defining a multiplicity of ratchet teeth, said threaded hole and said peripheral contour being coaxial.

9. An assembly as in claim 8, further comprising a locking element for preventing rotation of said nut in a direction of loosening, said locking element comprising a base and a spring arm supported by said base, said spring arm having a plurality of ratchet teeth arranged to mesh with said ratchet teeth on said nut when said spring arm is not flexed away from said nut.

10. The assembly as in claim 9, wherein said locking element further comprises a camming projection connected to said spring arm, said camming projection having a surface which is oblique relative to said shank axis.

11. A clamp assembly comprising:
a T-bolt comprising a shank having an axis and a head extending generally perpendicular to said shank axis, said shank comprising a threaded portion and said head having a length greater than a diameter of said shank;
a first clamping element having a first recess, a projection with first and second contact surfaces, and a first hole penetrated by a first portion of said shank, said first recess being a cylindrical section having an axis, said first clamping element being defined by an L-beam folded spring plate comprised of first and second plate parts disposed generally in parallel and joined at a living hinge flex joint so that said plate parts each have a free end edge remote from said flex joint, said free end edges being spaced apart to define a gap without preload, said plate parts each including a first portion that together define said projection with said first and second contact surfaces, and said plate parts each including a second portion disposed at an angle with respect to said first portion, said second portions together defining said first hole penetrated by said shank and terminating in said free end edges;
a second clamping element having a second recess, a land, a shoulder, and a second hole penetrated by a second portion of said shank, said second recess being a cylindrical section having an axis generally parallel to said axis of said first recess, said first contact surface of said projection of said first clamping element abutting said land, and said second contact surface of said projection of said first clamping element abutting said shoulder, and said first recess opposing said second recess such that a pipe of predetermined diameter arranged therebetween is thereby clamped; and
a threaded nut threadably coupled to said threaded portion of said shank, said first and second clamping elements being pressed together by a compressive load applied by said nut when tightened on said T-bolt.

12. The assembly as in claim 11, further comprising a lock washer arranged between said nut and said first clamping element, said lock washer comprising a locking spring arm for selectively preventing rotation of said nut in a direction of loosening.

13. The assembly as in claim 12, wherein said nut comprises a socket drive and a peripheral contour having a multiplicity of ratchet teeth, and said locking spring arm has a plurality of ratchet teeth arranged to selectively mesh with said ratchet teeth on said nut.

14. The assembly as in claim 13, wherein said lock washer further comprises a camming projection defined on said spring arm, said camming projection having a surface which is oblique relative to said shank axis.

15. The assembly as in claim 12, wherein said first clamping element includes a groove and said lock washer includes a key projection engaged with said groove.

16. An apparatus comprising:
a jet pump having an elongated hole having a width and a length formed in a wall thereof;
a jet pump sensing line; and
a clamping assembly attached to said jet pump and clamping said jet pump sensing line, wherein said clamping assembly comprises:
a T-bolt comprising a shank having an axis and an elongated head extending generally perpendicular to said shank axis, said shank comprising a threaded portion and said head having a length greater than a diameter of said shank, greater than said width of said elongated hole and less than said length of said elongated hole;
a first clamping element having a first recess, a projection with first and second contact surfaces, and a first hole penetrated by a first portion of said shank, said first recess being in contact with said jet pump sensing line, said first clamping element being defined by an L-beam folded spring plate comprised of first and second plate parts disposed generally in parallel and joined at a living hinge flex joint so that said plate parts each have a free end edge remote from said flex joint, said free end edges being spaced apart to define a gap without preload, said plate parts each including a first portion that together define said projection with said first and second contact surfaces, and said plate parts each including a second portion disposed at an angle with respect to said first portion, said second portions together defining said first hole penetrated by said shank and terminating in said free end edges;
a second clamping element having a second recess and a second hole penetrated by a second portion of said shank, said second recess being in contact with said jet pump sensing line and opposing said first recess; and
a threaded nut threadably coupled to said threaded portion of said shank, said first and second clamping elements being pressed together by a compressive load produced when said nut is tightened on said T-bolt, whereby said jet pump sensing line is clamped, and said gap is closed, whereby visual inspection can be used to verify, by closure of said gap, that the assembly is fully preloaded.

17. The apparatus as defined in claim 16, further comprising a lock washer arranged between said nut and said first clamping element.

18. The apparatus as in claim 17, wherein said first clamping element includes a groove and said lock washer includes a key projection engaged with said groove.

19. The apparatus as in claim 17, wherein said nut comprises a socket drive and a peripheral contour having a multiplicity of ratchet teeth, and said lock washer comprises a spring arm having a plurality of ratchet teeth arranged to mesh with said ratchet teeth on said nut when said spring arm is not flexed away from said nut.

20. The apparatus as defined in claim 16, wherein said second clamping element comprises a shoulder and a land, said first contact surface of said projection of said first clamping element abutting said land, and said second contact surface of said projection of said first clamping element abutting said shoulder.

* * * * *